United States Patent [19]

Marshall, Jr. et al.

[11] Patent Number: 4,607,379
[45] Date of Patent: Aug. 19, 1986

[54] CIRCUIT FOR CONNECTING TOGETHER MULTIPLE SERIAL DATA LINES

[75] Inventors: Trevor J. Marshall, Jr., Westport; Jacob F. Moskowitz, New Canaan, both of Conn.

[73] Assignee: CBS Inc., New York, N.Y.

[21] Appl. No.: 668,055

[22] Filed: Nov. 5, 1984

[51] Int. Cl.[4] .......................................... H04L 23/00
[52] U.S. Cl. .................................... 375/121; 375/36; 178/69 R
[58] Field of Search ................. 375/36, 121; 179/2 C, 179/2 DP; 307/147, 148; 178/63 R, 69 C, 69 R; 339/28, 29, 154 A, 156 R

[56] References Cited

U.S. PATENT DOCUMENTS

| 4,160,124 | 7/1979 | Law | 179/2 DP |
| 4,340,922 | 7/1982 | Delaporte | 375/121 |
| 4,373,117 | 2/1983 | Pierce | 179/2 DP |
| 4,403,111 | 9/1983 | Kelly | 178/63 R |

Primary Examiner—Robert L. Griffin
Assistant Examiner—Stephen Chin
Attorney, Agent, or Firm—Spencer E. Olson

[57] ABSTRACT

Apparatus operable without need for an external power source for conveniently interconnecting data communication equipment (DCE), such as a modem, and multiple data terminal equipments (DTE), such as terminals and/or printers, which each have an interface conforming to a serial data communications standard, for permitting access to the DCE of any of the DTEs that may be connected to the apparatus. In the preferred embodiment, intended for the interconnection of interfaces conforming to the E.I.A. RS-232-C standard, a circuit interconnecting the data leads of a multiplicity of pluggable cable connectors supported on a chassis includes a transistor connected to be powered by input data signals from the DTEs and to operate as a switch under certain signal conditions and to be effectively removed from the circuit under other signal conditions.

12 Claims, 12 Drawing Figures

PRIOR ART

FIG. 4A. PRIOR ART WITH $R_0 = 0$

FIG. 4B. PRIOR ART

FIG. 5A. WITH $R_0 = 0$

CIRCUIT FOR CONNECTING TOGETHER MULTIPLE SERIAL DATA LINES

BACKGROUND OF THE INVENTION

This invention relates generally to the field of data communications and, more particularly, to a circuit for the convenient connection together of multiple serial data lines.

The technology of data communications is primarily concerned with moving data from one discrete device to another, most commonly via cable. The point of connection between a device and the attached cable is called an interface. Unfortunately, the physical characteristics of data communications cable as well as the physical and electrical characteristics of the interface connections of different devices are far from uniform, which has given rise to the requirement for a standard. In the last several years, the number of interfaces has narrowed into a small group of widely used standards, the Electronic Industries Association Standard RS-232-C currently being the most universal. The standard defines the electrical characteristics for an interface between a piece of data terminal equipment (DTE) and a piece of data communications equipment (DCE). The DTE is typically a user's terminal but may also be a computer. The DCE is typically a modulator-demodulator (modem) which encodes the computer data, e.g., for telephone line transmission.

Figure 1:
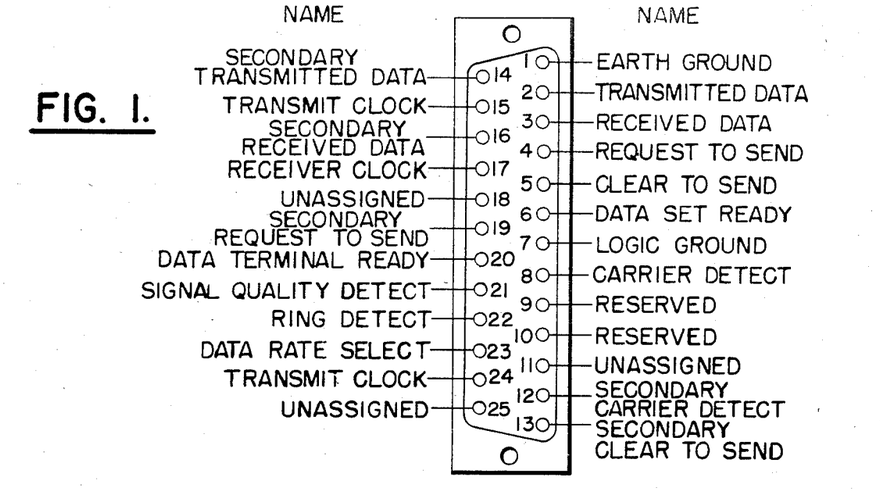
FIG. 1, to which reference has already been made, is a diagram illustrating a connector according to the EIA RS-232-C standard.

FIG. 1 illustrates the cable plug and the wires associated with the RS-232-C standard. The connector has twenty-five (25) pins, not all of which are used, however, in most applications. Pins 2 and 3 are the data-carrying wires, called transmitted and received data, respectively. Pin 7 is a signal ground which serves as a signal current return path. These three wires are sufficient for communication of data between DCE and DTE, and selected others of the wires serve as control wires between the DTE and DCE for establishing and maintaining communications with the computer, that is, for providing the handshaking function; pins 4, 5, 6, 8 and 20 are normally used for this purpose. Pin 1 is a protection ground. The pins not specifically called out above are not involved in the operation of the present invention and will, therefore, be ignored in the description to follow.

Figure 2:
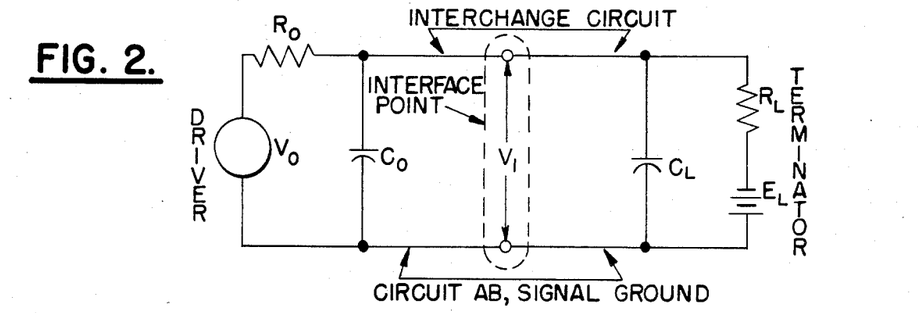
FIG. 2, referred to previously, is the interchange equivalent circuit according to the RS-232-C standard.

The EIA RS-232-C standard also includes the Interchange Equivalent Circuit, reproduced as FIG. 2, which shows the electrical parameters which are specified in the standard. The equivalent circuit is applicable to all interchange circuits regardless of the category (data, timing, or control) to which they belong, and is independent of whether the driver is located in the DCE and the terminator in the DTE or vice versa. The electrical parameters shown in FIG. 2 are as follows:

$V_o$ is the open-circuit driver voltage.

$R_o$ is the driver internal dc resistance.

$C_o$ is total effective capacitance associated with the driver, measured at the interface point and including any cable to the interface point.

$V_1$ is the voltage at the interface point.

$C_L$ is the total effective capacitance associated with the terminator, measured at the interface point and including any cable to the interface point.

$R_L$ is the terminator load dc resistance.

$E_L$ is the open-circuit terminator voltage (bias).

For data interchange circuits, the signal is in the marking condition (i.e., a logic "1") when the voltage $V_1$ is more negative than $-3$ volts with respect to signal ground, and is in the spacing condition (i.e., a logic "0") when the voltage $V_1$ is more positive than $+3$ volts with respect to signal ground. The region between $+3$ volts and $-3$ volts is a transition region in which the signal state is not uniquely defined. For timing and control interchange circuits, the function is considered ON when the voltage $V_1$ is more positive than $+3$ volts with respect to circuit AB, and is considered OFF when the voltage $V_1$ is more negative than $-3$ volts with respect to circuit AB. The function is not uniquely defined for voltages in the transition region between $+3$ volts and $-3$ volts.

The load impedance of the terminator side of the interface has a dc resistance ($R_L$) of not less than 3,000 ohms, measured with an applied voltage not greater than 25 volts, nor more than 7,000 ohms, measured with an applied voltage of 3 to 25 volts. The effective shunt capacitance ($C_L$) shall not exceed 2500 picofarads and the open circuit terminator voltage ($E_L$) shall not exceed two volts.

The open-circuit driver voltage ($V_o$) with respect to circuit AB on any interchange circuit shall not exceed 25 volts. The source impedance is not specified, but the combination of $V_o$ and $R_o$ shall be selected such that a short circuit between any two conductors in the interconnecting cable shall not result in a current in excess of one-half ampere. Additionally, the driver design shall be such that, when the terminator load resistance ($R_L$) is in the range between 3,000 ohms and 7,000 ohms and the terminator open-circuit voltage ($E_L$) is zero, the potential $V_1$ at the interface point shall not be less than 5 volts nor more than 15 volts in magnitude.

Frequently it is desirable to be able to conveniently interconnect two or more terminals (DTE) to one port of a computer, or to connect one terminal and one printer to one computer port or modem so that the DTEs can access the computer in parallel. As another example, it is frequently desirable to interconnect a computer in common with a telephone modem and a terminal, the terminal to be used with the computer while the user is at the office, and the telephone modem enabling the user to access the computer from home and to proceed from exactly where he/she was when he/she left the office, without need for manual switching. Another situation in which it is advantageous for several terminals to have access to a common computer is when the vendor of the computer hardware and/or software wishes to do debugging via telephone from a remote location and the owner wishes to observe what is going on and to occasionally make his/her own inputs; this requires the interconnection with the computer of a telephone modem and a terminal. In order to achieve such interconnection with a minimum of inconvenience it is desirable that the function be achieved without requiring an external source of power.

Figure 3:
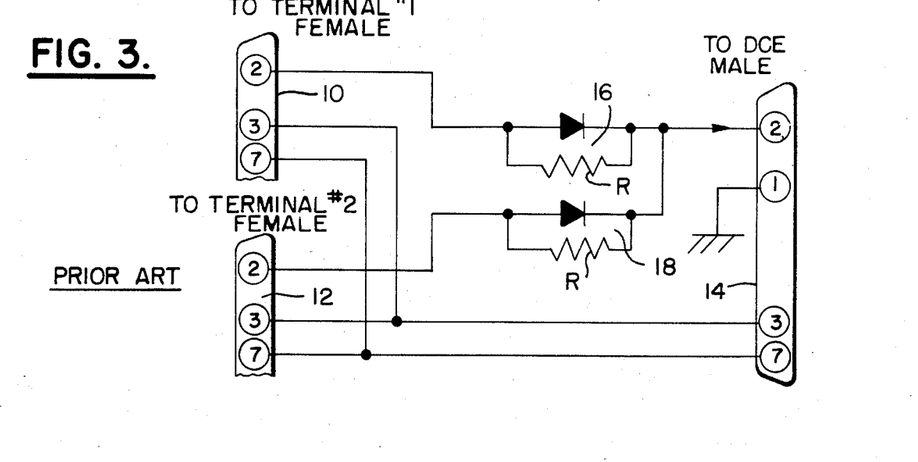
FIG. 3, to which previous reference has been made, is a circuit diagram of a relevant prior art device.

A known device for accomplishing the described function is the "Modem Splitter" commercially available from BLACK BOX Corporaton of Pittsburgh, Pa., which is a passive device requiring no external power source. The device, which is housed in a box-like enclosure, has four connectors conforming to the RS-232-C interface standard mounted thereon, one of which is adapted for attachment to a modem, with the others adapted for attachment to and interconnection with up to three terminals or monitors. As shown in FIG. 3, wherein only two connectors 10 and 12 (for connection to respective data terminals) and a connector 14 for plug-in application to a modem, are shown, the device utilizes diode circuits 16 and 18, each consisting of a diode and a 10K ohms resistor connected in parallel therewith, connected from the transmitted data pin 2 of each of the DTE connectors to pin 2 of the DCE connector. The received data lines (pin 3) and the signal ground lines (pin 7) are connected together as shown; lines 4 and 20, which are utilized to establish and maintain communication between the terminals and the modem, as well as such other line as might be involved in providing the handshaking function, have been omitted for clarity.

Figure 4A:
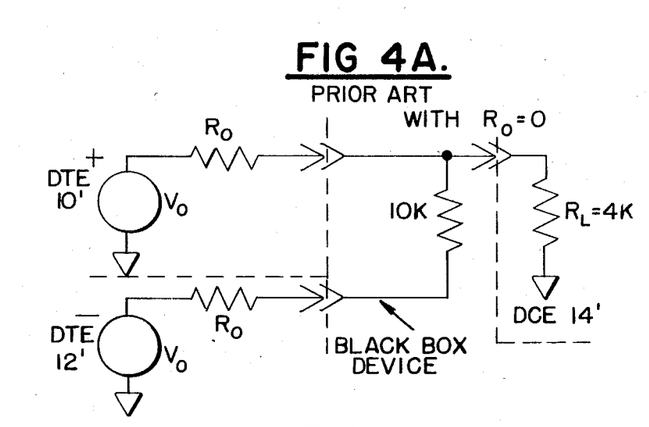
FIGS. 4A and 4B, to which reference has already been made, illustrate equivalent circuits of the prior art device of FIG. 3 under certain signal conditions.

While this product is relatively inexpensive and performs acceptably in a variety of applications, applicants have found that under certain conditions the device fails to operate satisfactorily, or does not conform to the R-232-C standard, particularly at bit rates above 9600 bits/second. The equivalent circuits shown in FIG. 4A and FIG. 4B of two possible signal/circuit conditions are illustrative of situations in which the BLACK BOX device fails to conform to the standard. FIG. 4A is the equivalent circuit of two DTEs 10' and 12', each having zero internal dc reistance ($R_o$) interconnected by the BLACK BOX device to a DCE 14' having a dc resistance $R_L$ of 4K ohms, and with the input from DTE 10' being plus and the input from DTE 12' being minus. The plus input signal from DTE 10' forward-biases diode 16 (FIG. 3) into conduction and is approximated as a short circuit. The minus input signal for DTE 12' reverse-biases its associated diode, thereby putting the 10K resistor of network 18 in parallel with $R_L$, which has been assumed to have a value of 4K ohms (within the RS-232-C standard). Thus, the equivalent load to either DTE is $(4 \times 10) \div (4+10) = 2.8K$ ohms, which does not conform to the RS-232-C standard which, it will be recalled, specifies a terminator load resistance in the range between 3K ohms and 7K ohms.

Figure 4B:
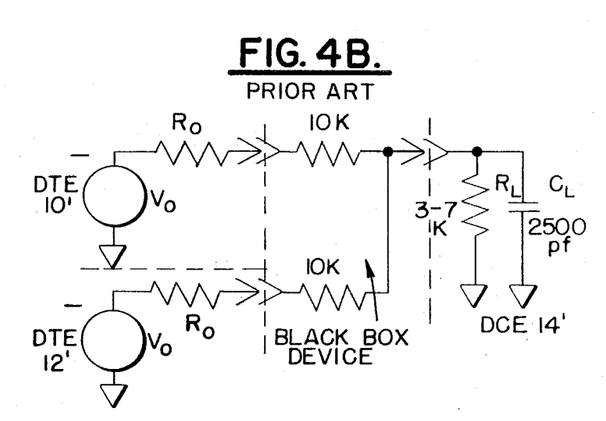

FIG. 4B is the equivalent circuit of two DTEs 10' and 12', each having zero dc internal resistance ($R_o$), interconnected by the BLACK BOX device to a DCE 14' having a dc resistance $R_L$ in the range of 3K to 7K ohms and a total effective capacitance of 2500 picofarads, with the input from one of the DTEs having just undergone a transition from plus to minus, the other remaining minus throughout. Just prior to the illustrated signal condition the capacitor would have been charged positively because the diode of one or the other of the circuits 16 or 18 would have been forward-biased; this capacitance must be rapidly discharged to enable the data signal to pass through the transition period within the time specified by the standard, which is not to exceed one millisecond or four percent of the the nominal duration of a signal element. Now, with both inputs minus both diodes are reverse-biased, and the two 10K resistors are put in parallel with each other thereby to put 5K ohms in parallel with the terminator load resistor; for a terminator resistance of 3K ohms the effective resistance is $(3 \times 5) \div 8 = 1.875K$ ohms, giving a time constant of 4.69 microseconds, and for a terminator resistance of 7K ohms the time constant is 7.29 microseconds, both of which are sufficiently long as to affect the quality of the signal passing through the interchange, particularly at high bit rates.

Inasmuch as many terminal devices and computers typically have bit rates higher than this, the highest currently available being 19,200 bits/second, there is a need for a plug-in device for hooking up more than two EIA RS-232-C standard terminals, computers, or modems, which will operate reliably at bit rates higher than 9600 bits per second, yet having the feature of not requiring an external power source.

SUMMARY OF THE INVENTION

The primary object of the present invention is to provide a pluggable circuit for connecting together multiple serial data lines which requires no external source of power and which operates at bit rates up to 19,200 bits/second.

Briefly, the interconnection device according to the invention comprises a chassis on which a multiplicity of RS-232-C standard cable connectors are mounted, one adapted for plug-in connection to a DCE device, such as a modem, and the others each adapted for interconnection with a respective data terminal equipment (DTE). The cable connectors are interconnected within the chassis by a circuit which provides access to a DCE coupled to the device of any of multiple DTEs that may be connected. In the preferred embodiment, isolation between the transmitted data lines of the multiple connectors is provided by a single transistor having base, emitter and collector electrodes and an associated diode and resistor network. In this embodiment, the emitter of the transistor is connected to the transmitted data line of the DCE connector and via a respective first diode to the transmitted data line of each of the DTE connectors. The base and collector electrodes are also connected to the transmitted data line of each DTE connector via respective second and third diodes. The transistor is powered with the signal voltage themselves so as not to require an external source of power, and functions as an "OR"-gate which allows input signals from any of the DTEs connected to the device to drive the output terminal (e.g., a modem coupled to a computer). The device also features an effective interconnection of others of the pins for accomplishing the handshaking function.

Other objects, features and advantages of the invention, and a better understanding of its construction and operation, will be had from the following detailed description taken in conjunction with the accompanying drawings.

DESCRIPTION OF THE PREFERRED EMBODIMENT

Figure 6:
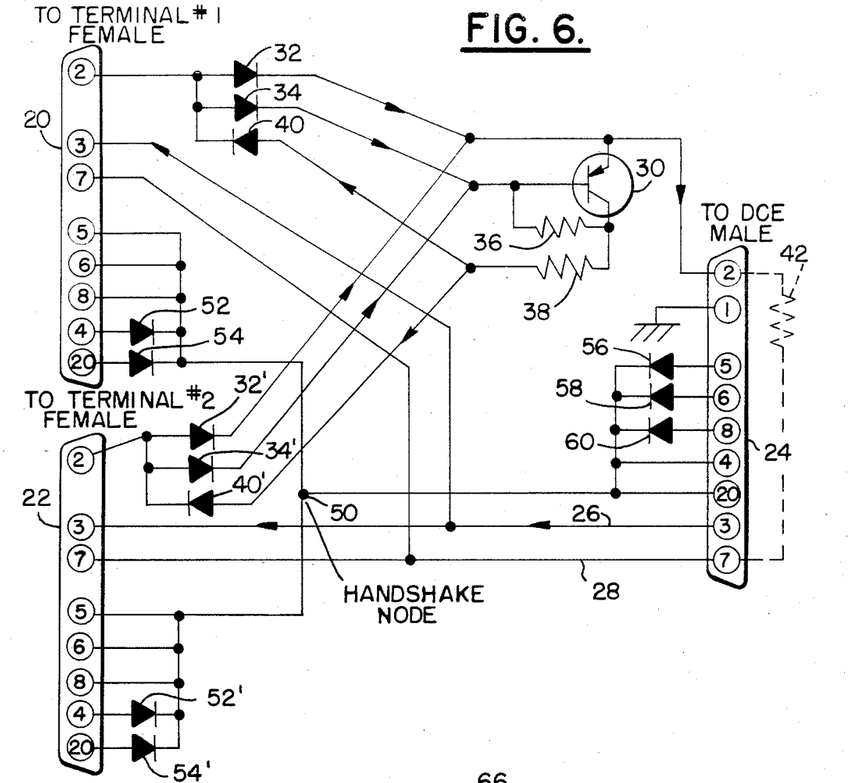
FIG. 6 is a circuit diagram of a preferred embodiment of a connecting device according to the invention.

Referring now to FIG. 6, which is a circuit diagram of what is now considered to be the preferred embodiment of the invention, except that it shows only two connectors adapted for connection to data terminal equipment, whereas typically it would have three or more such terminals. In other words, the figure schematically shows two female connectors 20 and 22, respectively designated terminal #1 and terminal #2, each having the construction shown in detail in FIG. 1 and adapted for plug-in attachment to mating male connectors cabled to two data terminal equipments, whereas the preferred construction would include additional connectors. These connectors are interconnected with a third connector, in the preferred embodiment a male connector 24, also having the configuration shown in FIG. 1. The received data lines (pin 3) of all three connectors are connected together by a connection 26, the signal ground lines (pin 7) of all three connectors are likewise connected together by conductors 28, and the protective lead (pin 1) of connector 24 is grounded as shown.

The transmitted data leads (pin 2) of connectors 20 and 22 are both connected to the transmitted data lead of connector 24 (as would lead 2 of the additional connectors), but isolated from each other so that each of the connected DTEs can access the DCE, the isolation being achieved by a single transistor 30 and associated sets of three diodes. More particularly, the emitter electrode of transistor 30, which is of the P-N-P type, is directly connected to pin 2 of connector 24 and is also connected via a first diode 32 to pin 2 of connector 20 and via a first diode 32' to pin 2 of terminal 22, and would be connected via respective diodes to pin 2 of such additional DTE connectors as may be used in the device. The base electrode of the transistor is also connected to pin 2 of each of connectors 20 and 22 (and such additional connectors as there may be) via respective second diodes 34 and 34', both poled to favor the conduction of current in the direction indicated by the arrows on the associated conductors so as to reverse-bias the baseemitter junction of the transistor; diodes 32 and 32' are poled in the same direction as diodes 34 and 34'. A first resistor 36, typically having a value of 56K ohms, is connected between the base and collector electrodes of the transistor and a short-preventing resistor 38, typically having a value of 100 ohms, is connected from the collector and to pin 2 of each of connectors 20 and 22 via respective third diodes 40 and 40', both of which are poled oppositely to the other two associated diodes. The important element of novelty is that the transistor, which usually is an active device requiring energization from an external power source, is powered by the signal voltages themselves, thus eliminating the need for and the inconvenience of an external source of power, and making the device electrically safe and convenient and simple to use.

Assuming that communication has been established between the terminals (DTEs) and the DCE (modem) by handshaking hardware (to be described) and/or software, in operation, the transistor 30 and associated diodes functions as a logical "OR"-gate. It will be recalled that the RS-232-C standard specifies that a voltage at the interface more positive than +3 volts represents a logic "0" (a voltage in the range from +6 volts to +12 volts is typical in actual practice), and that a voltage at the interface more negative than −3 volts (typically −6 volts to −12 volts) represents a logic "1". Further, operation of the circuit depends on the presence in the DCE of an effective dc load impedance of not less than 3000 ohms nor more than 7000 ohms. This impedance is shown in phantom in FIG. 6 and identified by reference numeral 42. Considering first the situation where the potential on lead 2 of both of connectors 20 and 22 is positive, for example, at +10 volts, diodes 32 and 34, as well as diodes 32' and 34', are forward-biased so as to each apply a +10 volts signal to both the base and emitter electrodes of the transistor which will, in effect, remove the transistor from the circuit and thereby allow the signal transmitted via diodes 32 and 32' from both connectors to be passed on to pin 2 of the DCE connector 24. Thus, if the terminals connected to connectors 20 and 22 should be operating simultaneously (not the usual case), it is possible that data from both terminals will be simultaneously communicated to the DCE; should this occur, the DCE will simply recognize the garbled data as an error and reject it, and no data will be erased nor other damage done.

Considering now the situation where the potential at pin 2 of the connector 20 is positive, say +10 volts, and the potential at pin 2 of connector 22 is negative, say −10 volts, diode 34 is forward-biased and applies a positive potential to the base electrode of the transistor, and diode 32 is also forward-biased and applies the same positive potential to the emitter electrode. At the same time diode 40' is forward-biased by the negative potential at pin 2 of connector 22 and applies a negative potential to the collector of the transistor. Although under these conditions transistor 30 is powered by virtue of the collector being negative with respect to the emitter, it is switched off because of the positive potential applied to the base; consequently, only the positive potential from pin 2 of connector 20, coupled via diode 32, is transmitted to pin 2 of the connector 24. Because of the symmetry of the connections from pin 2 in connectors 20 and 22 to the transistor circuit, if the situation were reversed, that is, a positive potential on pin 2 of connector 22 and a negative potential on pin 2 of connector 20, the positive signal would again prevail. Thus, in this situation the circuit functions as a logical "OR" gate to protect pin 2 of the multiple DTEs from each other if two or more should be simultaneously connected.

Should the potential on lead 2 of all of the DTE connectors be negative at the same time, say −10 volts, diodes 40 and 40' will conduct and each apply a negative potential of −10 volts to the collector electrode, which because of the forward bias provided by resistor 36, will turn transistor 30 on, the resulting current flow in impedance 42 developing a sufficiently negative potential at pin 2 of connector 24 to hold the transmitted data lead in marking condition.

Figure 5A:
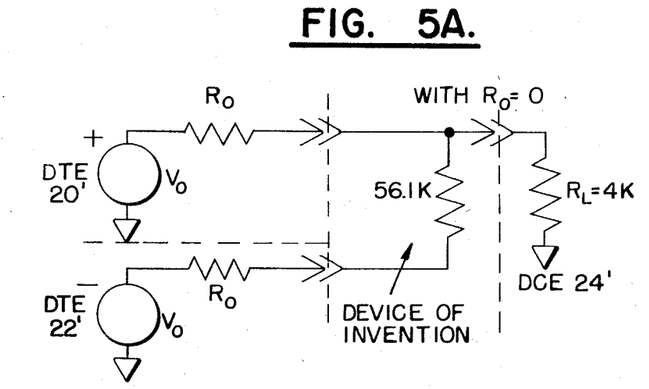
FIGS. 5A and 5B, respectively illustrate equivalent circuits of the device according to the present invention under the signal conditions shown in FIGS. 4A and 4B.

It will have become apparent that when the potential at both of the inputs (or at all of the inputs in the case of more than two DTE connectors) are either positive or negative there is no conflict and the transistor would not be needed. The only time there is a conflict is if one or more of the inputs is positive and the others are negative; unlike the BLACK BOX device in which each isolating circuit consists of a diode shunted by a 10K ohm resistor, a compromise which works for most situations but which under certain signal conditions (described above) do not conform to the RS-232-C standard, the transistor in the present circuit performs acceptably under these same signal conditions. For example, for the situation illustrated by the equivalent circuit of FIG. 5A of two DTEs interconnected with a DCE by the device of the present invention, with the input from one DTE plus and the input from the other minus, the plus input forward-biases the associated diode 32 and applies the potential to the 4K ohms terminator resistor, and the minus input forward-biases its associated diode 40 (or 40') and, in effect, connects resistor 36, typically having a value of 56K ohms, in parallel with the terminator resistor. Thus, the equivalent load to either DTE is $(4 \times 56.1) \div 60.1 = 3.73K$ ohms, which is greater than the 3K ohms minimum specified by the RS-232-C standard.

Figure 5B:
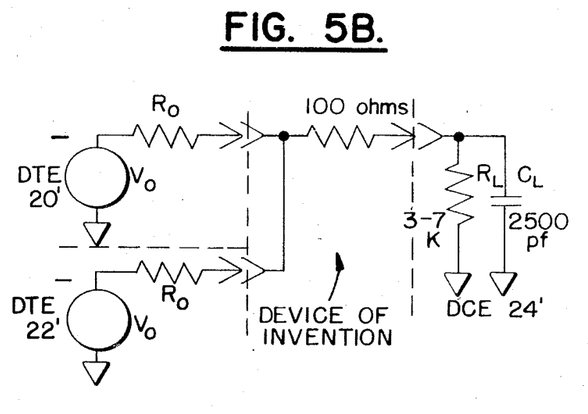

FIG. 5B compares the performance of the device of the invention with that of the BLACK BOX device for the signal condition described above in connection with FIG. 4B for two DTEs, each having zero dc internal resistance ($R_o$), connected to a DCE having a dc resistance $R_L$ in the range between 3K and 7K ohms and a total effective capacitance of 2500 picofarads. With both inputs minus only the diodes 40 and 40' conduct thereby to put the short-preventing resistor 38, typically having a resistance of 100 ohms (if used at all), in parallel with $R_L$; for an $R_L$ value anywhere in the 3000 to 7000 ohms range the effective resistance is about 97 ohms, giving a time constant of about 0.24 microseconds, much shorter then in the BLACK BOX device under a like signal condition. Regarding the requirement for multiple diodes, the commercial availability of arrays of diodes in chip form, such as the Fairchild 2620 chip, keeps the cost of the diodes and their assembly to the transistor circuit to a minimum.

The interconnection device of the invention also incorporates circuitry for providing the handshaking function between multiple DTEs and a DCE, or more accurately, for preventing hardware handshaking from being a problem in the data communications, since the handshaking function is more and more being taken care of in software, typically through the use of so-called "XON/XOFF" signals. Recalling that under the RS-232-C standard, for control interchange circuits the function is ON when the voltage $V_1$ is more positive than $+3$ volts and is OFF when the voltage $V_1$ is more negative than $-3$ volts, the circuit utilizes a handshaking node approach which, basically, provides that if any connector line involved in the handshaking function (i.e., pins, 4, 5, 6, 8 and 20 in the RS-232-C standard) is at a potential more positive than $+3$ volts all of the corresponding pins of all interconnected connectors will have the same positive potential. This, in effect, prevents hardware handshaking from being a problem when software is used to accomplish the handshaking function. To this end, pins 5, 6 and 8 of each of the female connectors (i.e., connectors 20 and 22 in FIG. 6) are connected together and to a common connection 50 characterized as a "handshake node", and pins 4 and 20 of each connector are connected via separate diodes 52 and 54, respectively, to node 50, the diodes being poled to conduct toward the node. In the single male connector 24, pins 4 and 20 are directly connected to node 50 and pins 5, 6 and 8 are connected to the node via respective diodes 56, 58 and 60; these diodes are also poled to conduct toward the node. Should dynamic hardware handshaking be required, a second transistor/diode circuit of the form described above for the data lines can be used as needed for the particular application.

Figure 7:
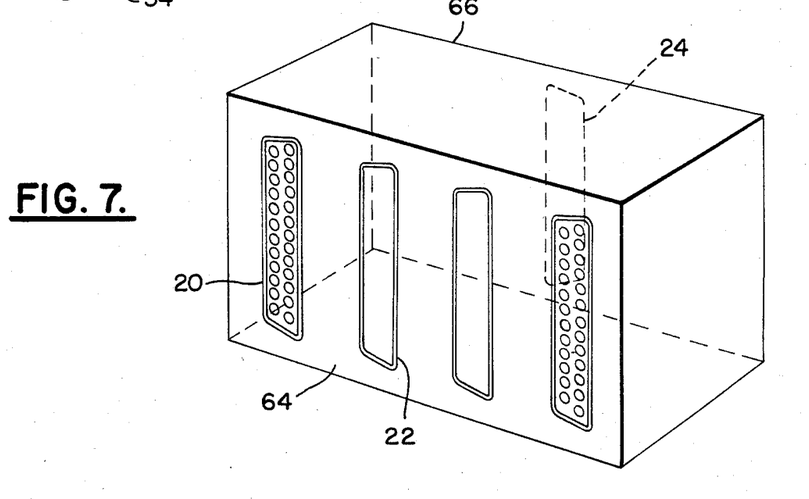
FIG. 7 is a pictorial view of a chassis in which the circuit of FIG. 6 is incorporated.

For convenience in use the circuit of FIG. 6 is contained in an enclosed chassis, preferably having the geometry shown in FIG. 7, namely, a box-like enclosure 62 which may be approximately four inches long by two inches high by two inches deep. The female connectors, four of which (including connectors 20 and 22) are shown, are preferably mounted on one sidewall 64 of the box and the single male connector 24 is mounted on the opposite sidewall 66. This construction makes the device convenient to use regardless of the number of DTEs (up to four in the illustrated embodiment) it is desired to interconnect with the DCE. It will have become apparent from the foregoing description that one or more "open" female connectors will have no effect on the operation of the connected DTEs.

Figure 6A:
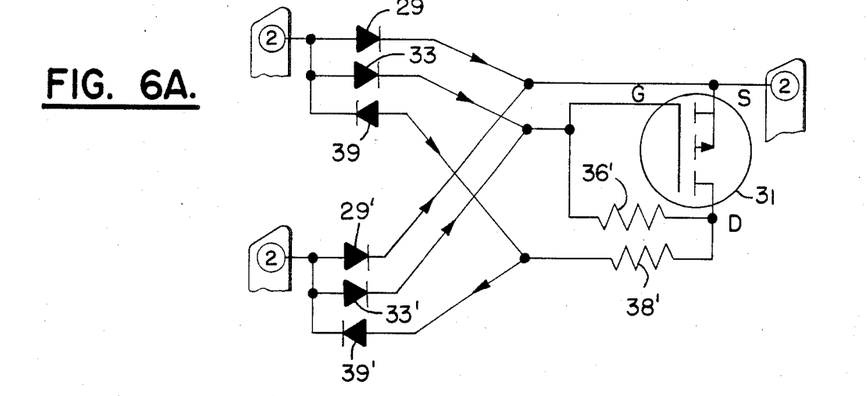
FIG. 6A is a circuit diagram of a portion of FIG. 6 illustrating an alternative form of the device.

Although a preferred embodiment has been described it will now be apparent to ones skilled in the art that various modifications can be made without departing from the spirit of the invention. For example, to accommodate certain manufacturers' terminals more conveniently, the indicated female connectors can be exchanged for male connectors, or the single male connector can be a female connector, with, of course, appropriate modification of the interconnecting circuitry, and the principles of the invention can be extended to other current or future standards for serial data communication. It will be understood that the handshaking hardware operates independently of the data handling portion of the device and can, therefore, be replaced with other handshaking hardware, or omitted should it not be required. Also, although the preferred embodiment, intended for use with the RS-232-C standard, utilizes a transistor of the P-N-P type, it is within the contemplation of the invention to use semiconductor devices of other types. For example, as shown in FIG. 6A, a field effect transistor 31 of the P-channel type may be directly substituted for the P-N-P transistor 30 without altering the polarities of any of the isolating diodes. That is, the gate electrode of FET 31 is connected to the transmitted data leads of the multiple DTE connectors via respective diodes 33 and 33' poled to favor conduction of current in a direction to decrease the conductivity of the FET, the source electrode is directly connected to the transmitted data lead of the DCE connector and via respective diodes 29 and 29', poled in the same direction as diodes 33 and 33', to the transmitted data leads of the DTE connectors, and the drain electrode is also connected via respective diodes 39 and 39', which are poled oppositely to diodes 33 and 33', to the transmitted data leads of the multiple DTE connectors.

Figure 8:
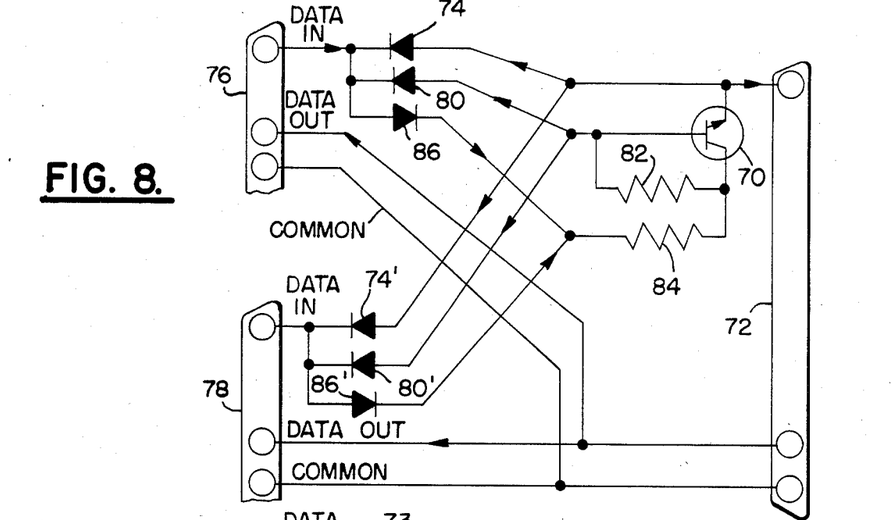
FIGS. 8 and 8A are circuit diagrams of other alternative forms of the connecting device.
Figure 8A:
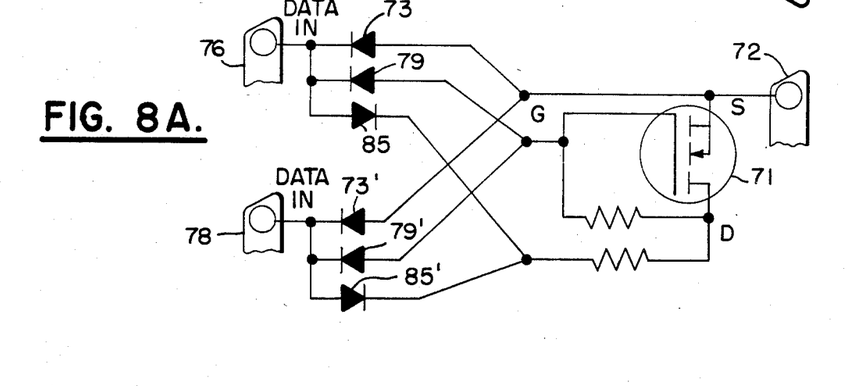

Should there be a need for an interconnecting device for use with a serial data communication standard which utilizes negative logic (i.e., the reverse of the logic used in the RS-232-C standard), the circuits of FIGS. 6 and 6A can be modified as shown in FIGS. 8 and 8A, respectively, by replacing P-N-P transistor 30 with an N-P-N transistor 70, or replacing the P-channel FET 31 with an N-channel FET 71, and in both cases reversing the polarities of the diodes. More particularly, in the FIG. 8 circuit, the emitter of transistor 70 is directly connected to the DATA IN lead of a DCE connector 74 and via respective diodes 74 and 74' to the DATA IN terminals of two (there may be more) DTE connectors 76 and 78. The base electrode is also connected to the DATA IN leads of connectors 76 and 78 via respective diodes 80 and 80' poled in the same direction as diodes 74 and 74' so as to favor conduction of current in a direction to reverse-bias the base-emitter junction. The collector electrode is connected via a biasing resistor 82 to the base electrode and via short-preventing resistor 84 and respective diodes 86 and 86', poled oppositely to diodes 80 and 80', to the DATA IN leads of connectors 76 and 78.

Referring now to FIG. 8A, the polarities of the diodes for the N-channel FET 71 are the same as for corresponding diodes in the FIG. 8 implementation; that is, diodes 79 and 79' connected to the gate electrode are poled to favor the conduction of current in a direction so as to decrease the conductivity of the FET; diodes 73 and 73' connected to the source electrode are poled in the same direction as diodes 79 and 79'; and diodes 85 and 85' connected to the drain electrode are poled oppositely to diodes 79 and 79'.

In addition to the four described semiconductor devices, others that are adapted to be powered by the data signals, without requiring an external source of power, and adapted to be active under certain signal conditions and to be effectively removed from the circuit under other signal conditions, are within the contemplation of the invention.

We claim:

1. Apparatus operable without need for an external source of power for the interconnection of data communications equipment (DCE), such as a modem, with multiple data terminal equipments (DTE), such as terminals and printers, which each have an interface conforming to a predetermined serial data communication standard, for allowing access in parallel to the DCE with a minimum of adverse electrical interaction of any interconnected DTEs, said apparatus comprising:
a chassis on which are supported a multiplicity of pluggable cable connectors each conforming to said standard and having at least transmitted data, received data and signal ground leads, one of which connectors being adapted for plug-in-connection to a DCE and the others each being adapted for plug-in connection to a respective DTE, and
a circuit enclosed within said chassis and including
first connecting means for connecting the received data leads of all of said connectors together,
second connecting means for connecting the signal ground leads of all of said connectors together, and
third connecting means for connecting the transmitted data lead of said other connectors in parallel to the transmitted data lead of said one connector, said third connecting means including a normally active semiconductor device having three electrodes and a plurality of diodes for separately coupling the electrodes of said semiconductor device to the transmitted data lead of said other connectors, said diodes being poled to cause said semiconductor device to be powered by data signals applied to the transmitted data lead of one or more of said other connectors and to be switched off responsively to application to the transmitted data leads of two or more of said other connectors of data signals having predetermined conditions of relative polarity and amplitude and causing said third connecting means to function as a logical "OR" gate and to be effectively disconnected from said third connecting means responsively to application to the transmitted data leads of two or more of said other connectors of data signals which lack said predetermined relative polarity and amplitude conditions.

2. Apparatus as defined in claim 1, wherein said semiconductor device is a transistor having emitter, collector and base electrodes, and wherein
said base electrode is connected via respective first diodes to the transmitted data leads of said other connectors, all of said first diodes being poled to favor the conduction of current in a direction to reverse-bias the base-emitter junction of the transistor,
said emitter electrode is connected to the transmitted data lead of said one connector and via respective second diodes to the transmitted data leads of said other connectors, all of said second diodes being poled in the same direction as said first diodes, and
wherein said collector electrode is connected via respective third diodes to the transmitted data leads of said other connectors, all of said third diodes being poled oppositely to said first diodes.

3. Apparatus as defined in claim 2, wherein said transistor is of the P-N-P type,
the cathodes of all of said first diodes are connected to the base electrode of the transistor,
the cathodes of all of said second diodes are connected to the emitter electrode of the transistor, and
the anodes of all of said third diodes are coupled to the collector electrodes of the transistor.

4. Apparatus as defined in claim 2, wherein said transistor is of the N-P-N type,
the anodes of all of said first diodes are connected to the base electrode of the transistor,
the anodes of all of said second diodes are connected to the emitter electrode of the transistor, and
the cathodes of all of said third diodes are coupled to the collector electrode of the transistor.

5. Apparatus as defined in claim 1, wherein said predetermined standard is the Electronic Industries Association RS-232-C standard,
wherein said semiconductor device is a transistor of P-N-P type having emitter, collector and base electrodes, and wherein
said emitter electrode is connected to the transmitted data lead of said one connector and via respective second diodes to the transmitted data lead of said other connectors, the cathodes of all of said second diodes being connected to the emitter electrode of the transistor,
said base electrode is connected via respective first diodes to the transmitted data lead of said other connectors, the cathodes of all of said first diodes being connected to said base electrode,
said collector electrode is coupled via respective third diodes to the transmitted data lead of said other connectors, the anodes of all of said third diodes bieng coupled to said collector electrode, and
a biasing resistor is connected between said base and collector electrodes.

6. Apparatus as defined in claim 1, wherein said semiconductor device is a field effect transistor (FET) having source, drain and gate electrodes, and wherein
said gate electrode is connected via respective first diodes to the transmitted data leads of said other connectors, all of said first diodes being poled to favor the conduction of current in a direction such as to decrease the conductivity of the FET, said source electrode is connected to the transmitted data lead of said one connector and via respective second diodes to the transmitted data leads of said other connectors, all of said second diodes being poled in the same direction as said first diodes, and said drain electrode is coupled via respective third diodes to the transmitted data leads of said other connectors, all of said third diodes being poled oppositely to said first diodes.

7. Apparatus as defined in claim 1, wherein each of said pluggable connectors additionally has handshaking originating and receiving leads and wherein said apparatus further comprises:

second circuit means enclosed within said chassis for providing handshaking between DTEs plugged into said chassis and a DCE plugged into said chassis, including connecting means connecting the handshaking originating and receiving leads of all of said connectors together and to a common node.

8. Apparatus as defined in claim 7, wherein at least one of said pluggable connectors is a DTE connector and at least one of said pluggable connectors is a DCE connector, wherein said handshaking originating and receiving leads of said connectors include request to send, data ready, carrier detect, and data terminal ready leads, wherein the request to send and the data terminal ready leads of said at least one DTE connector are connected to said common node via a respective fourth diode poled to favor the conduction of current toward said common node, and wherein the clear to send, the data set ready and the carrier detect leads of said at least one DCE connector is connected to said node via a respective fifth diode poled to favor conduction of current toward said node.

9. Apparatus as defined in claim 5, wherein at least one of said pluggable connectors is a DTE connector and at least one of said pluggable connector is a DCE connector and each of said connectors additionally has request to send, clear to send, data ready, carrier detect, and data terminal ready leads, and wherein said apparatus further comprises:

second circuit means within said chassis for providing handshaking between DTEs plugged into said chassis and a DCE plugged into said chassis, including first connecting means for connecting the request to send and the data terminal ready leads of said at least one DTE connector via respective fourth diodes to a common node, and second connecting means for connecting the clear to send, the data set ready, and the carrier detect leads of said at least one DCE connector via respective fifth diodes to said common node, all of said fourth and fifth diodes being poled to favor conduction of current toward said common node.

10. In apparatus for the interconnection of data communications equipment (DCE) with multiple data terminal equipments (DTE) which each have an interface conforming to a predetermined serial data communication standard, which apparatus includes a chassis on which are supported a multiplicity of pluggable cable connectors each conforming to said standard and having at least request to send, clear to send, data set ready, carrier detect, and data terminal ready leads, one of which connectors is adapted for plug-in connection to a DCE and the others each being adapted for plug-in connection to a respective DTE, circuit means enclosed within said chassis for providing a handshaking function between the DCE and DTEs plugged into said chassis, said circuit means comprising:

connecting means for connecting to a common node the request to send, the clear to send, the data set ready, the carrier detect, and the data terminal ready leads of each of said connectors, said connecting means including means responsive to a positive potential applied to any one of the aforesaid leads of any connector to cause said positive potential to appear on all of the aforesaid leads of all of said connectors.

11. Apparatus as defined in claim 10, wherein said means responsive to a positive potential includes a plurality of diodes each connected to a respective one of said aforesaid leads and poled to favor conduction of current toward said common node.

12. Apparatus as defined in claim 11, wherein said predetermined standard is the Electronic Industries Association RS-232-C standard, wherein at least one of said connectors is a DTE connector and at least one of said connectors is a DCE connector, wherein the request to send and the data terminal ready leads of said at least one DCE connector are connected to said common node via respective first diodes, and wherein the clear to send, the data set ready, and the carrier detect leads of said at least one DTE connector are connected to said common node via respective second diodes.

* * * * *